(12) United States Patent
Mitamura et al.

(10) Patent No.: US 6,900,940 B2
(45) Date of Patent: May 31, 2005

(54) OPTICAL APPARATUS AND DEVICE

(75) Inventors: Nobuaki Mitamura, Sapporo (JP); Hirotomo Izumi, Sapporo (JP); Yuichi Kawahata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 10/164,438

(22) Filed: Jun. 10, 2002

(65) Prior Publication Data

US 2003/0128431 A1 Jul. 10, 2003

(30) Foreign Application Priority Data

Jan. 9, 2002 (JP) ........................................ 2002-002682

(51) Int. Cl.[7] ................................................ G02B 1/10
(52) U.S. Cl. ..................... 359/580; 359/577; 359/583; 398/81; 398/147
(58) Field of Search ................................ 359/577, 580, 359/583, 615, 629, 589, 590, 839, 857; 398/81, 147; 356/519

(56) References Cited

U.S. PATENT DOCUMENTS

| | | | | |
|---|---|---|---|---|
| 4,767,196 | A | * | 8/1988 | Jewell ........................ 359/241 |
| 5,076,672 | A | * | 12/1991 | Tsuda et al. ................. 359/244 |
| 5,469,288 | A | * | 11/1995 | Onaka et al. ............... 398/202 |
| 5,930,045 | A | | 7/1999 | Shirasaki ..................... 359/577 |
| 5,969,865 | A | | 10/1999 | Shirasaki ..................... 359/577 |
| 5,969,866 | A | | 10/1999 | Shirasaki ..................... 359/577 |
| 5,973,838 | A | | 10/1999 | Shirasaki ..................... 359/577 |
| 5,999,320 | A | | 12/1999 | Shirasaki ..................... 359/577 |
| 6,028,706 | A | | 2/2000 | Shirasaki ..................... 359/577 |
| 6,144,494 | A | | 11/2000 | Shirasaki ..................... 359/578 |
| 6,169,630 | B1 | | 1/2001 | Shirasaki ..................... 359/577 |
| 6,185,040 | B1 | | 2/2001 | Shirasaki ..................... 359/578 |
| 6,296,361 | B1 | | 10/2001 | Shirasaki ..................... 359/868 |
| 6,304,382 | B1 | | 10/2001 | Shirasaki ..................... 359/577 |

FOREIGN PATENT DOCUMENTS

| | | |
|---|---|---|
| JP | 7-49469 | 2/1995 |
| JP | 11-72756 | 3/1999 |
| JP | 2000-511655 | 9/2000 |
| JP | 2002-514323 | 5/2002 |

OTHER PUBLICATIONS

G. R. Fowles, 'Introduction to Modern Optics', Dover Publications, New York, pp. 86–103, 1968.*
Japanese Published Patent Application No. 2000–511655A (Reference AL) corresponds to U.S. Appl. No. 5,930,045 (Reference AA).
Japanese Published Patent Application No. 2000–514323A (Reference AL) corresponds to U.S. Appl. No. 5,969,865 (Reference AB).
Japanese Published Patent Application No. 11–72756 has an English abstract attached thereto.
Japanese Published Patent Application No. 7–49469 has a partial English translation attached thereto.

* cited by examiner

*Primary Examiner*—Thong Nguyen
*Assistant Examiner*—Arnel C. Lavarias
(74) *Attorney, Agent, or Firm*—Staas & Halsey LLP

(57) ABSTRACT

A VIPA plate having a configuration where a translucent reflection film and a total reflection film are respectively arranged on one side and the other side of a transparent parallel plate can be used as a wavelength dispersion compensator by using a special mirror and a lens. However, the transparency characteristic of the wavelength dispersion compensator using such a VIPA plate is a periodical characteristic which is asymmetric with a central wavelength in a wavelength regime. Accordingly, not parallel light but converged or diverged light having angular dispersion is input to an etalon plate, so that a filter whose transparency characteristic is an asymmetric periodical characteristic which is reverse to the VIPA plate is configured for the central wavelength in the wavelength regime. With this filter, the transparency characteristic of the wavelength dispersion compensator using the VIPA plate is optimized.

18 Claims, 18 Drawing Sheets

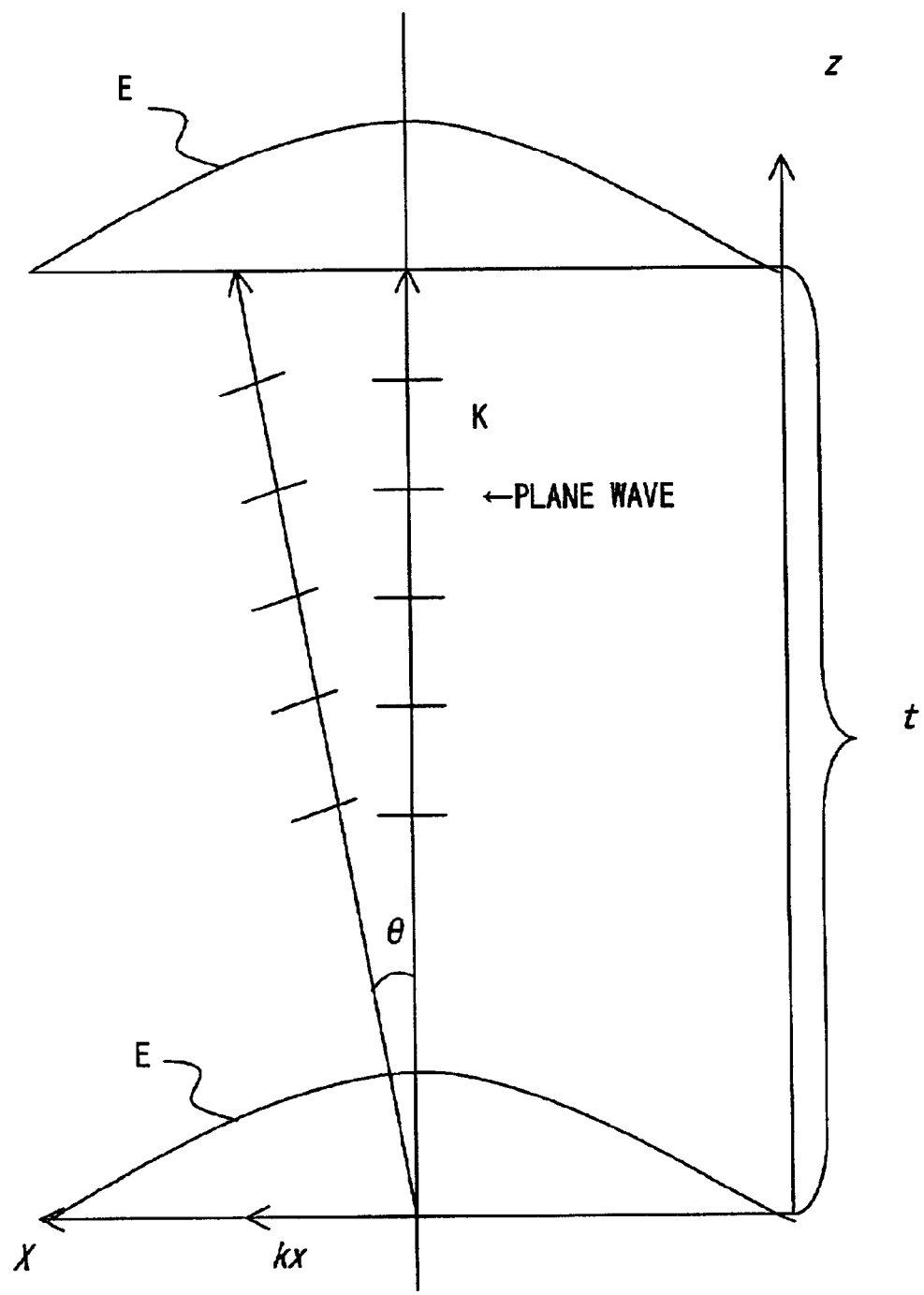
F I G. 4

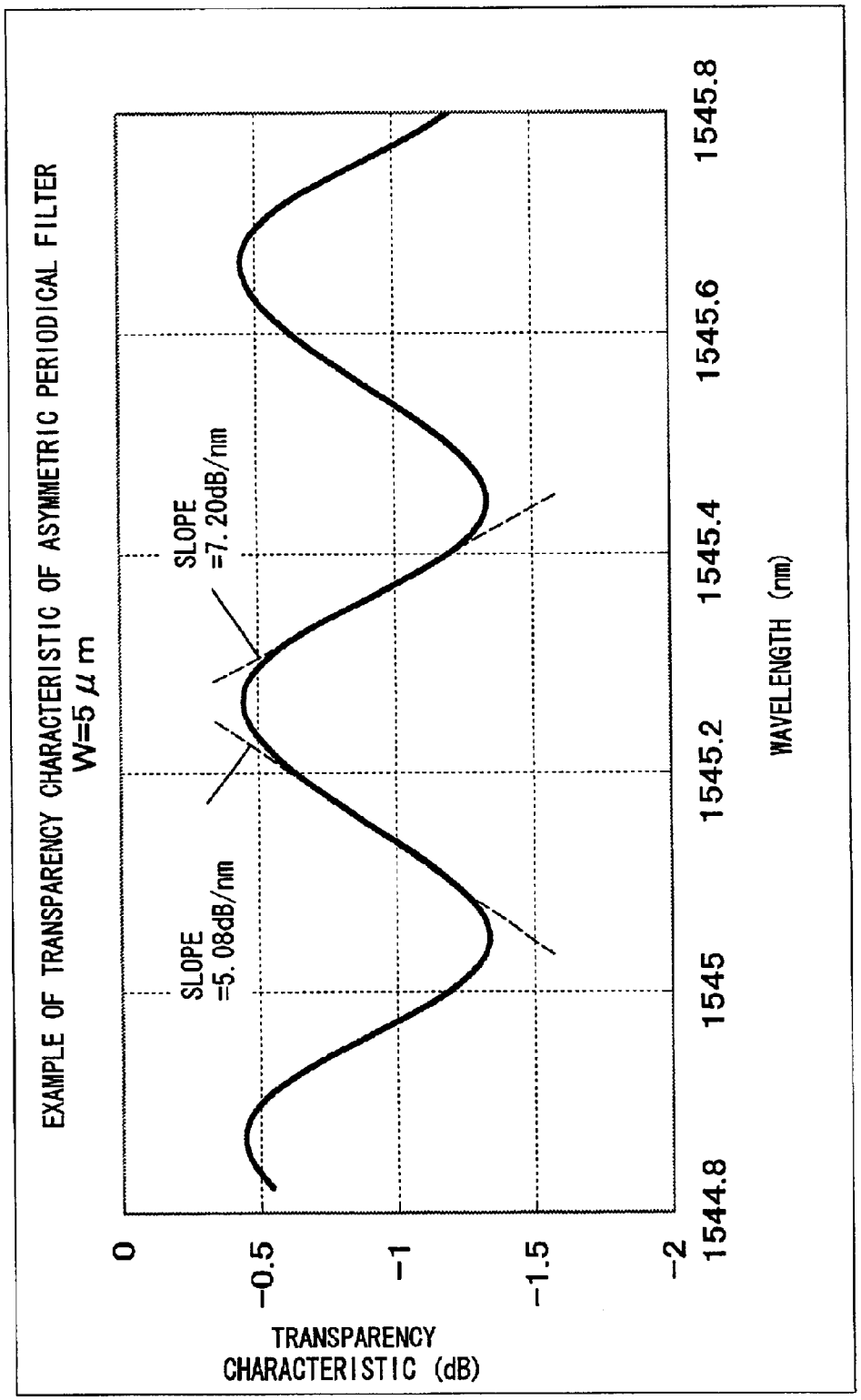
F I G. 5

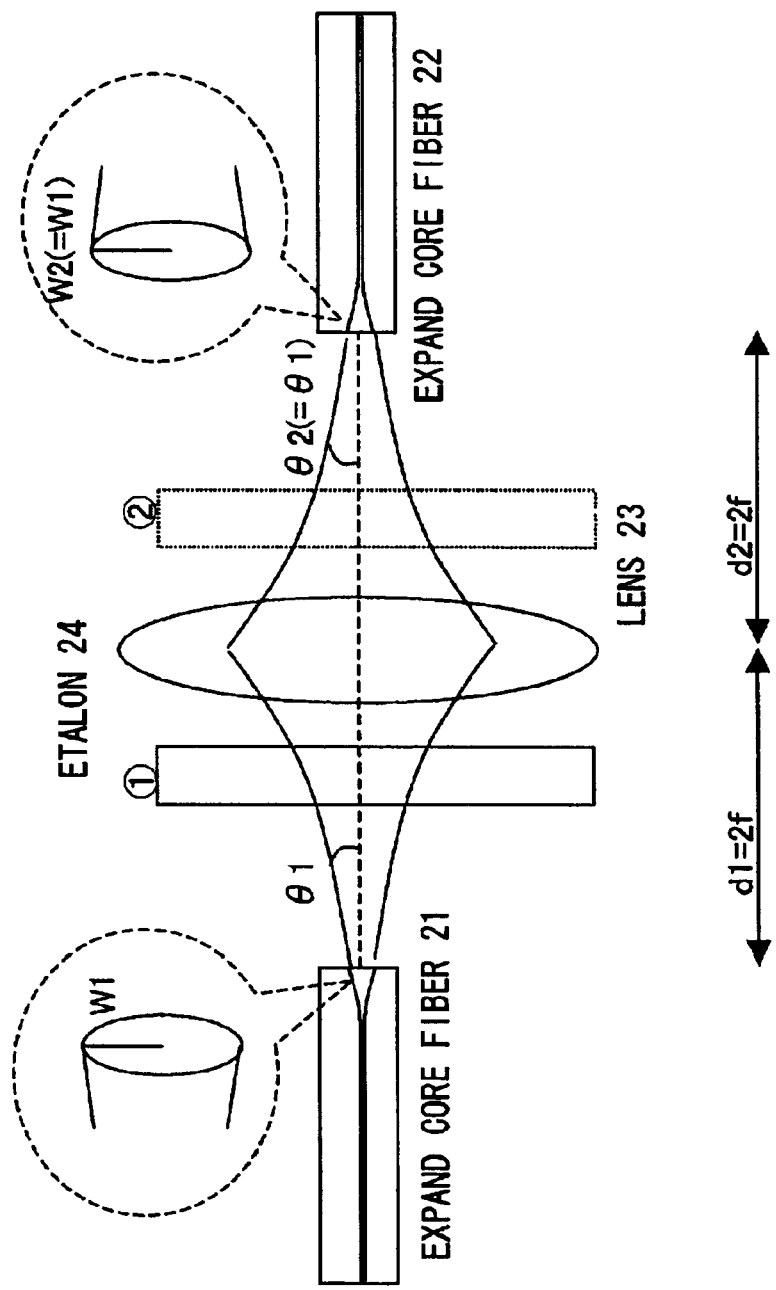
F I G. 1 3

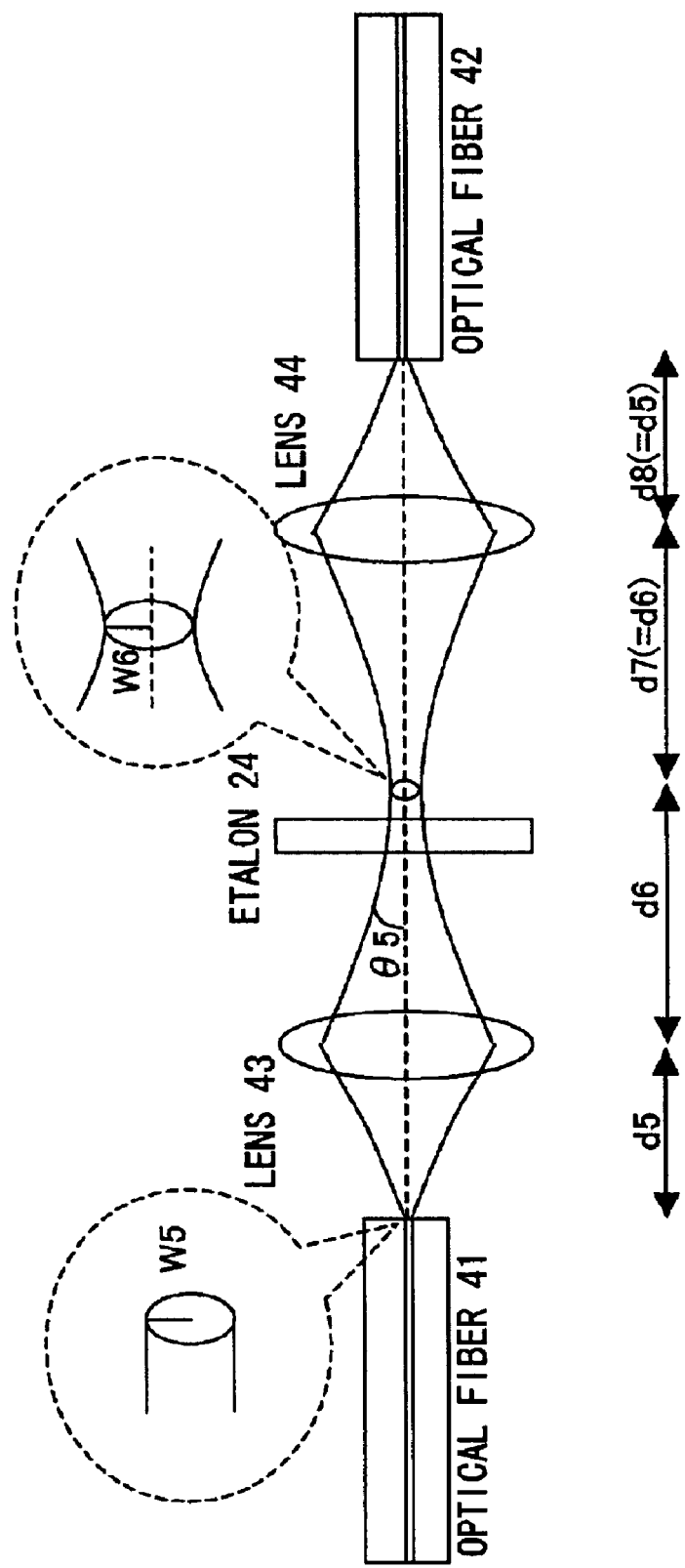
F I G. 1 7

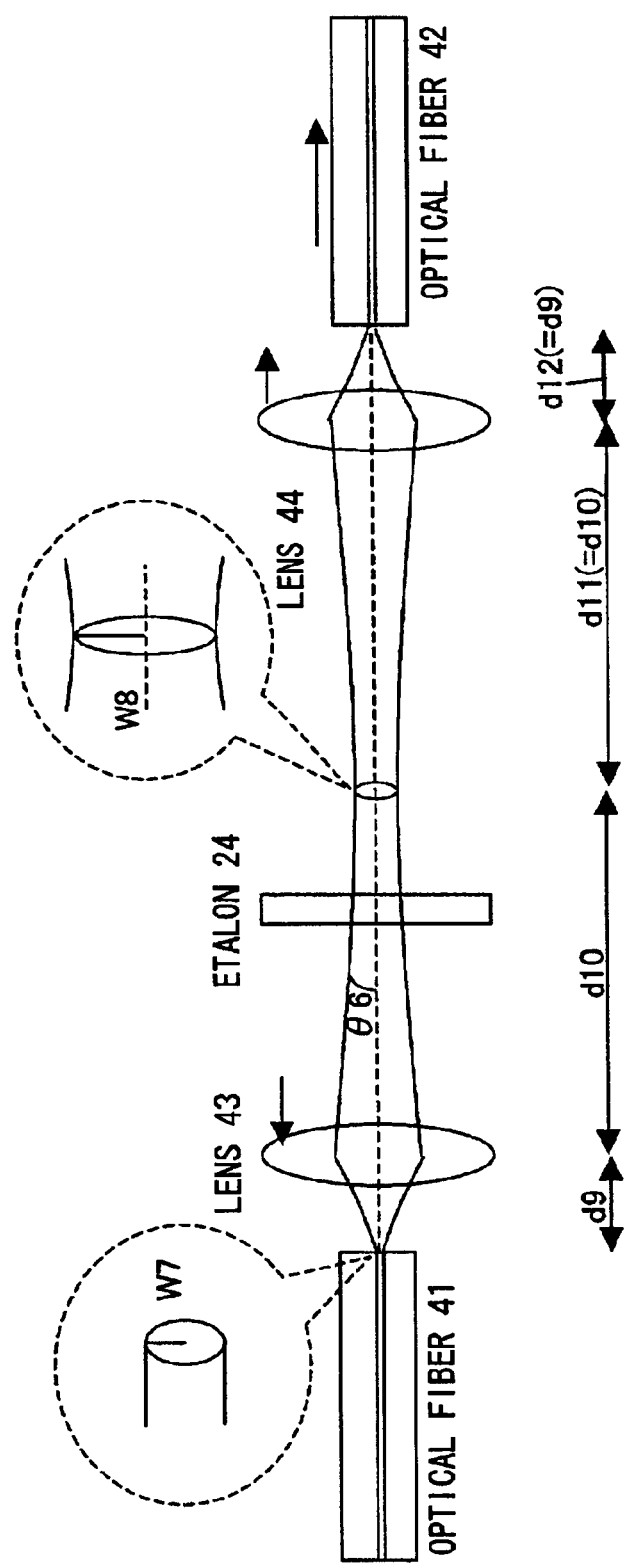
F I G. 1 8

OPTICAL APPARATUS AND DEVICE

BACKGROUND OF THE INVENTION

1. Field of the Invention

The present invention relates to a device generating wavelength dispersion, and a device used to compensate for wavelength dispersion accumulated in an optical fiber transmission line.

To be more specific, the present invention relates to a device which uses a virtually imaged phased array in order to generate wavelength dispersion.

2. Description of the Related Art

A transmitter for transmitting information with light in a conventional optical fiber communications system transmits optical pulses to an optical fiber. Light from the optical fiber is received by a light receiver.

However, the optical fiber has wavelength dispersion, which is also called chromatic dispersion.

The wavelength dispersion changes the pulse width of a signal of the system, so that the quality of the signal is degraded.

To be more specific, the propagation speed of signal light within an optical fiber depends on the wavelength of the signal light because of the wavelength dispersion.

For example, when an optical pulse having a long wavelength (such as an optical pulse having a wavelength of red color) propagates faster than an optical pulse having a short wavelength (such as an optical pulse having a wavelength of blue color), this dispersion is called normal dispersion.

Inversely, an optical pulse having a short wavelength (such as a blue pulse) propagates faster than a pulse having a long wavelength (such as a red color pulse), this dispersion is called abnormal dispersion.

Accordingly, if signal light pulses include red and blue pulses when being transmitted from a transmitter, they are separated into red and blue pulses while propagating within an optical fiber, and the respective optical pulses are received by a light receiver at different times.

Another example of an optical pulse transmission is such that: when signal light pulses having wavelength components which are successive from blue to red are transmitted, the components respectively propagate within an optical fiber at different speeds. Therefore, the time width of the signal light pulses is widened within the optical fiber, which causes distortion. Since all of pulses include a component within a finite wavelength range, such wavelength dispersion is very common in an optical fiber communications system.

Accordingly, especially in a high-speed optical fiber communications system, it becomes necessary to compensate for wavelength dispersion so as to obtain a high transmission ability.

To compensate for such wavelength dispersion, an optical fiber communications system requires a reverse dispersion component which gives to an optical pulse wavelength dispersion reverse to that occurring in an optical fiber.

As one reverse dispersion component, a device including a virtually imaged phase array, namely, a portion called VIPA 1 shown in FIG. 1 is conventionally proposed by Japanese Patent Application Nos.10-534450 and 11-513133.

The VIPA plate 1 generates light which propagates from the VIPA plate 1 with angular dispersion. This device also includes a light returning device 2 for returning light to the VIPA plate 1, and for causing multiple reflection within the VIPA plate 1.

The above described device is implemented by comprising a device including the VIPA plate 1, which receives input light of a wavelength within a continuous wavelength range, and successively generates corresponding output light. The output light can be distinguished spatially from output light having another wavelength within the continuous wavelength range (for example, the output light proceeds in a different direction). If this output light can be distinguished with a proceeding angle, this device is proved to have angular dispersion.

The VIPA comprises a transparent area and a transparent member.

Light passes through the transparent area, so that it can be input/output to/from the VIPA.

The transparent member 3 has first and second surfaces.

The first and the second surfaces are reflection planes. The reflection plane of the second surface has both a characteristic which reflects light, and a characteristic which passes part of input light.

Input light passes through the transparent area, Is received by the VIPA plate 1, and reflected many times between the first and the second surfaces of the transparent member, so that a plurality of lights pass through the second surface.

The plurality of passed lights interfere with one another, thereby generating output light 4.

The input light has a wavelength within a continuous wavelength range, and the output light can be distinguished spatially from light having another wavelength within the wavelength range.

The light returning device 2 can return the output light to the second surface in exactly the reverse direction. The output light passes through the second surface, is input to the VIPA plate 1, and multiple-reflected within the VIPA plate 1, so that the output light is output from the transparent region of the VIPA plate 1 to an input path.

Additionally, the above described device generates a plurality of output lights that have the same wavelength as that of the input light, and have different interference orders.

This device also comprises a light returning device 2 which returns output light corresponding to one interference order to the VIPA plate 1, and does not return the other output lights.

As a result, only light corresponding to one interference order is returned to the VIPA plate 1.

Furthermore, the above described device comprises the VIPA plate 1, the light returning device 2, and a lens 5.

The VIPA plate 1 receives input light, and generates corresponding output light which propagates from the VIPA plate 1.

The light returning device 2 receives the output light from the VIPA plate 1, and returns the output light to the VIPA plate 1.

The lens 5 is positioned so that (a) the output light proceeds from the VIPA plate 1 to the light returning device 2 via the lens 5 by being focused on the light returning device 2 by the lens 5, (b) the output light is returned from the light returning device 2 to the VIPA plate 1 via the lens 5 by being directed toward the VIPA plate 1 by the lens 5, and (c) the output light proceeds from the VIPA plate 1 to the lens 5 in parallel and in the direction reverse to the output light which is returned from the lens 5 to the VIPA plate 1.

Additionally, the output light which proceeds from the VIPA plate 1 to the lens 5 does not overlap the output light which is returned from the lens 5 to the VIPA plate 1.

Furthermore, the above described device comprises a device comprising a mirror 6.

The VIPA plate 1 receives input light, and generates corresponding output light which propagates from the VIPA plate 1.

The lens 5 focuses the output light on the mirror 6, which reflects the output light, so that the reflected light is returned to the VIPA plate 1 by the lens 5.

The mirror 6 is formed so that the device makes constant wavelength dispersion.

As described above, the VIPA plate 1 has an angular dispersion function like a diffraction grating, and enables wavelength dispersion compensation. Especially the VIPA plate 1 has a characteristic of having large angular dispersion, and can easily provide a practical reverse dispersion component.

However, the device that uses the VIPA plate for wavelength dispersion compensation still has a problem that the characteristic of transmittance of a wavelength is not flat, and becomes a periodical characteristic which is asymmetric with respect to the peak of a wavelength within each transparent bandwidth as shown in FIG. 2.

If a device having such a transparent characteristic which is not flat and asymmetric exists on an optical transmission line, distortion occurs in a signal light pulse waveform transmitted from a transmitter, and the signal cannot be properly transmitted. Especially, if wavelength dispersion compensation is made by adopting a device using a VIPA plate in many stages in a long-haul optical fiber communications system for which large wavelength dispersion must be compensated, the above described undesirable transparency characteristics is superposed. As a result, a signal light pulse is significantly degraded.

Accordingly, it is desirable that a device using a VIPA plate has a flat wavelength characteristic of output light.

The above described transparency characteristic which is not flat and asymmetric occurs in principle in a device using a VIPA plate due to the following reason.

Light having wavelengths, which is output from the VIPA plate, has a plurality of proceeding directions of different interference orders. Therefore, the intensity of the light is dispersed into lights having the plurality of interference orders.

In the device using the VIPA plate, unnecessary interference order light must be cut, and only one necessary interference order light must be extracted. Accordingly, if unnecessary interference order light to be cut is output from the VIPA plate, optical loss corresponding to this light occurs.

In the meantime, whether or not each interference order light is output from the VIPA plate depends on whether or not the direction where each interference order light is to proceed is included among the proceeding directions of parallel light components within the input light which is focused on the VIPA plate by the lens.

Accordingly, the degree of occurrence of unnecessary interference order light differs depending on a wavelength.

A direction which satisfies an interference condition on a short wavelength side is a direction upward from a central wavelength, whereas a direction which satisfies an interference condition on a long wavelength side is a direction downward from the central wavelength.

At this time, interference light does not occur unless a region where optical energy exists and a region which satisfies an interference condition overlap. However, since an angle between different orders is large under the interference condition on the long wavelength side, a plurality of interference lights do not occur. Therefore, a lot of energy is distributed also to a portion of an unnecessary order, which produces dropped light. As a result, an optical loss on the long wavelength side increases.

Accordingly, losses on the short and the long wavelength sides get out of balance, so that asymmetry occurs in the transparency characteristic.

A method improving such a transparency characteristic, and implementing a desirably flat transparency characteristic in a device using a VIPA is not specifically disclosed by Japanese Patent Application Nos. 10-534450 and 11-513133.

In the meantime, as a conventional method preventing the degradation of an optical signal due to the transparency characteristic of an optical device, a method comprising an optical compensation filter having a transparency characteristic, which converts a transparency characteristic into a flat characteristic, is proposed by Japanese Patent publication No. 11-72756.

However, the transparency characteristic of an optical filter which adopts conventionally known Mach-Zehnder Interference using a waveguide, or Fabry-Perot interference using an etalon becomes a periodical characteristic which is symmetrical with reference to the peak of a wavelength as shown in FIG. 3. Therefore, strict flattening is impossible for a device using a VIPA plate.

Note that an asymmetric filter can be implemented by overlaying Fourier filters whose passing light cycles are different in many stages. However, this implementation is impractical due to the following reasons. As the number of filters increases, so does the loss of passing light. Additionally, the filters cost high.

SUMMARY OF THE INVENTION

An object of the present invention is to provide a means for improving the wavelength characteristic of output light to a desirable one with a practical method in a device using a VIPA plate, which is intended to compensate for wavelength dispersion.

As first means:

an optical device comprises: an optical element in which a translucent reflection film and a reflection film are respectively arranged on one side and the other side of a transparent member, and to which focused light is input; and an asymmetric periodical filter having an asymmetric periodical characteristic placed on an input light side of the optical element.

As second means:

the optical device comprises: an optical element in which a translucent reflection film and a reflection film are respectively arranged on one side and the other side of a transparent member, and to which focused light is input; a mirror reflecting to the optical element the light split by the optical element; and an asymmetric periodical filter making the light reflected by the mirror pass through with an asymmetric periodical characteristic.

As third means:

the cycle of the asymmetric periodical filter of the optical device as the first and the second means is equal to or an integral submultiple of the cycle of the optical element.

As fourth means:

the asymmetric periodical filter of the optical device as the first and the second means is an etalon, and a desired transparent wavelength characteristic is obtained by making diverged or converged light pass through the etalon.

As fifth means:

the asymmetric periodical filter of the optical device as the first and the second means comprises: a pair of optical fibers; at least one lens converging diverged light output from one of the pair of optical fibers, and coupling the light to the other of the pair of the optical fibers; and an etalon, wherein the etalon is interposed between one of the pair of optical fibers and the lens, and diverged or converged light is made to pass through the etalon.

BRIEF DESCRIPTION OF THE DRAWINGS

FIG. 4 explains a method calculating the transparency characteristic of an asymmetric periodical filter according to a preferred embodiment of the present invention;

FIG. 5 shows an example where diverged light having a maximum diverging angle θ of 5.5 degrees of a 0th order Gaussian beam is input to an etalon;

FIG. 13 shows the outline of the configuration of the asymmetric periodical filter;

FIG. 17 shows the outline of the configuration of the asymmetric periodical filter; and FIG. 18 shows the outline of the configuration of the asymmetric periodical filter.

DESCRIPTION OF THE PREFERRED EMBODIMENTS

Preferred embodiments according to the present invention are described in detail below.

A filter which has an asymmetric periodical characteristic, and is connected to a device comprising VIPA is described below.

Specifically, an etalon is made to pass diverged or converged light having an angular distribution.

Figure 3:
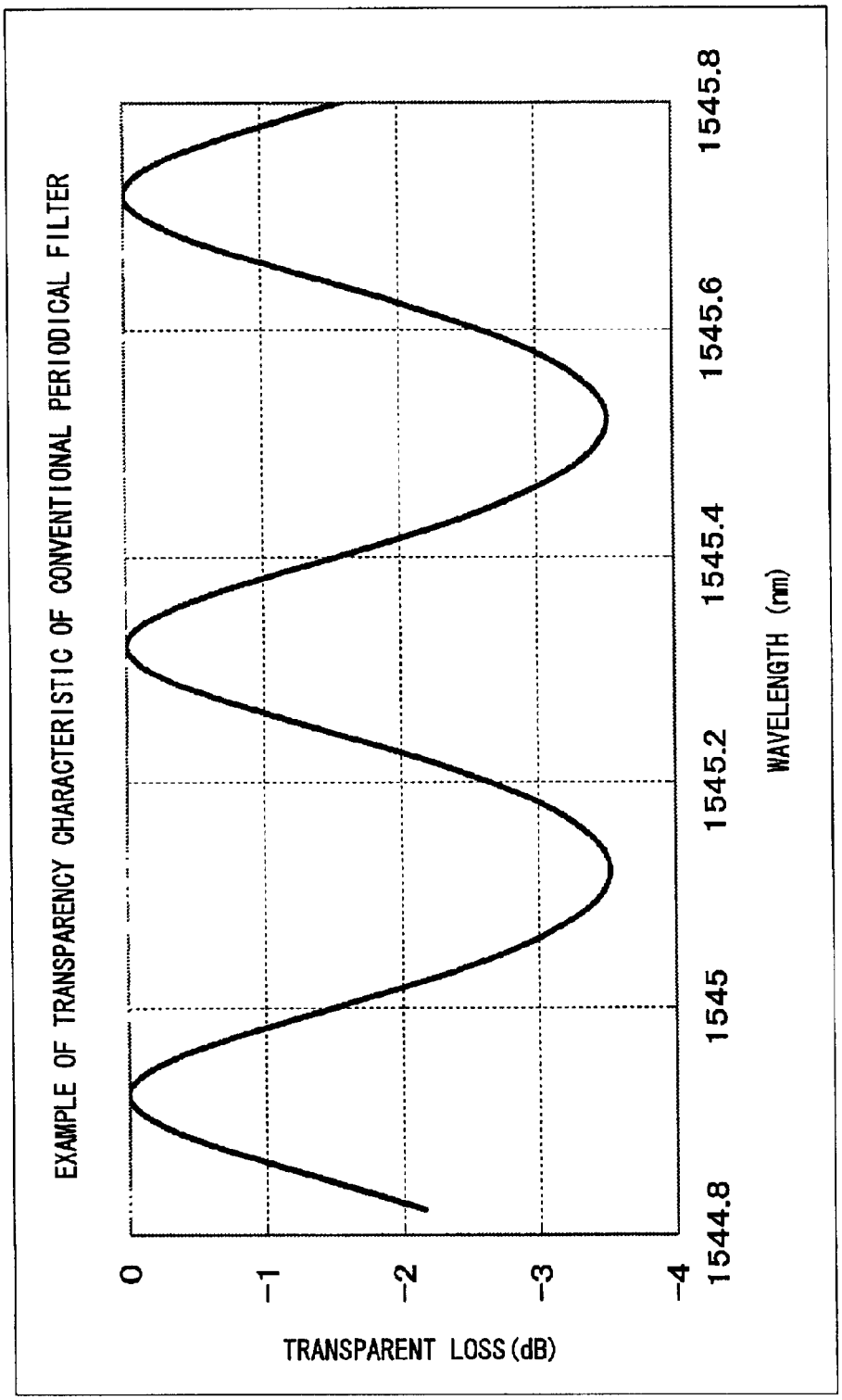
FIG. 3 shows the transparency characteristic of an optical filter adopting Fabry-perot interference using an etalon.

Generally, the relationship between the transparency characteristic when parallel light is input to the etalon, namely, a transmittance I and a wavelength λ is given by an equation (1). The wavelength λ(central wavelength λc), whose transmittance becomes the maximum, periodically exists, and the transparency characteristic becomes symmetric with reference to the central wavelength as shown in FIG. 3.

$$I=1/(1+4R\sin^2(2\pi nt\cos\theta/\lambda)/(1-R)^2 \tag{1}$$

where R indicates a reflectance of a reflection film, n indicates a refractive index of an etalon gap, t indicates the physical thickness (distance) of the etalon gap, and θ indicates an input angle of light.

$$\lambda_c = 2nt\cos\theta/m \tag{2}$$

where m indicates an order.

The equations (1) and (2) are satisfied only when parallel light is input to the etalon. The present invention makes the etalon pass diverging or converged light having an angular distribution.

This is equivalent to an input of light having a different input angle θ, and asymmetry occurs in the transparency characteristic. An optical filter used by the present invention is an asymmetric periodical filter which positively uses this principle.

Here, a process of actually calculating the transparency characteristic of the asymmetric periodical filter according to the present invention is explained with reference to FIG. 4.

Firstly, light on an etalon is broken down into plane waves, and each of the wavefronts is multiplied by a phase change which occurs in the distance t between etalons, so that plane waves are synthesized. This calculation is repeated by the number of times of reflection that occurs in the etalon.

If the above described operations are put into an equation, the following equation is obtained.

$$E_{i+1}(x)=F^{-1}(F(E_i(x))G(k_x)) \tag{3}$$

where E indicates a complex amplitude, a subscript i indicates the number of reflection times, and F and $F^{-1}$ indicate operators which indicate Fourier transform and inverse Fourier transform.

Here, Fourier transform of Ei corresponds to the operation for breaking down light into plane waves. Inverse Fourier transform is an operation for restoring a result of the calculation made by breaking down light into plane waves to a spatial distribution of the complex amplitude of light.

Additionally, considering a reflectance each time reflection is made, the complex amplitude of E, whose number of reflection times is large, is set to be attenuated.

For G which indicates a phase change, the following equation is obtained by assuming that the number of wavelengths of diverged light (or converged light) is K, and the number of wavelengths in an x direction is $k_x$.

$$Knt\cos(k_x/K), \text{ where } \theta \div k_x/K \tag{4}$$

Since this is a paraxial discussion, Taylor expansion is made, and the equation is remained up to the 2nd order. As a result, the following equation is obtained.

$$G(k_x)=\exp(-iKnt(1-k_x^2/2K^2)) \tag{5}$$

Passing light is obtained by adding output light bit by bit while being multiple-reflected within the etalon. Therefore, the following equation is obtained by assuming that an even-numbered i which indicates the number of reflection times represented by the equation (3) is output light.

$$T = \Sigma_j E_{2j-1} \quad (6)$$

By taking the squared absolute value of the equation (6), the transparency characteristic of the etalon when diverged light is input can be calculated.

FIG. 5 shows an example where diverged light whose beam radius W of a beam waist (spot size by which the intensity becomes $1/e^2$) is 5 μm, and whose maximum diverging angle θ of a 0th Gaussian beam is 5.5 degrees is input to the etalon with such a method.

It is proved from FIG. 5 that an asymmetric periodical transparency wavelength characteristic is obtained.

This is further described in detail. If the ratio (a slope of a short wavelength/a slope of a long wavelength) of the maximum slope (absolute value) on the short wavelength side of the transparency peak to that on the long wavelength side is defined to be the degree of asymmetry, it is 5.08/7.20=0.706.

Additionally, the maximum diverging angle (hereinafter referred to simply as a diverging angle) indicates an angle formed by the angle at which light whose intensity becomes $1/e^2$ geometrical-optically, and an optical axis.

As a matter of course, also a reflection wavelength characteristic becomes an asymmetric periodical characteristic, and this may be used.

Here, the following relationship exists between the beam radius W and the diverging angle θ, and it is proved that as the beam radius W decreases, the diverging angle θ increases.

$$\theta = \tan^{-1}(\lambda/\pi W) \quad (7)$$

Figure 6:
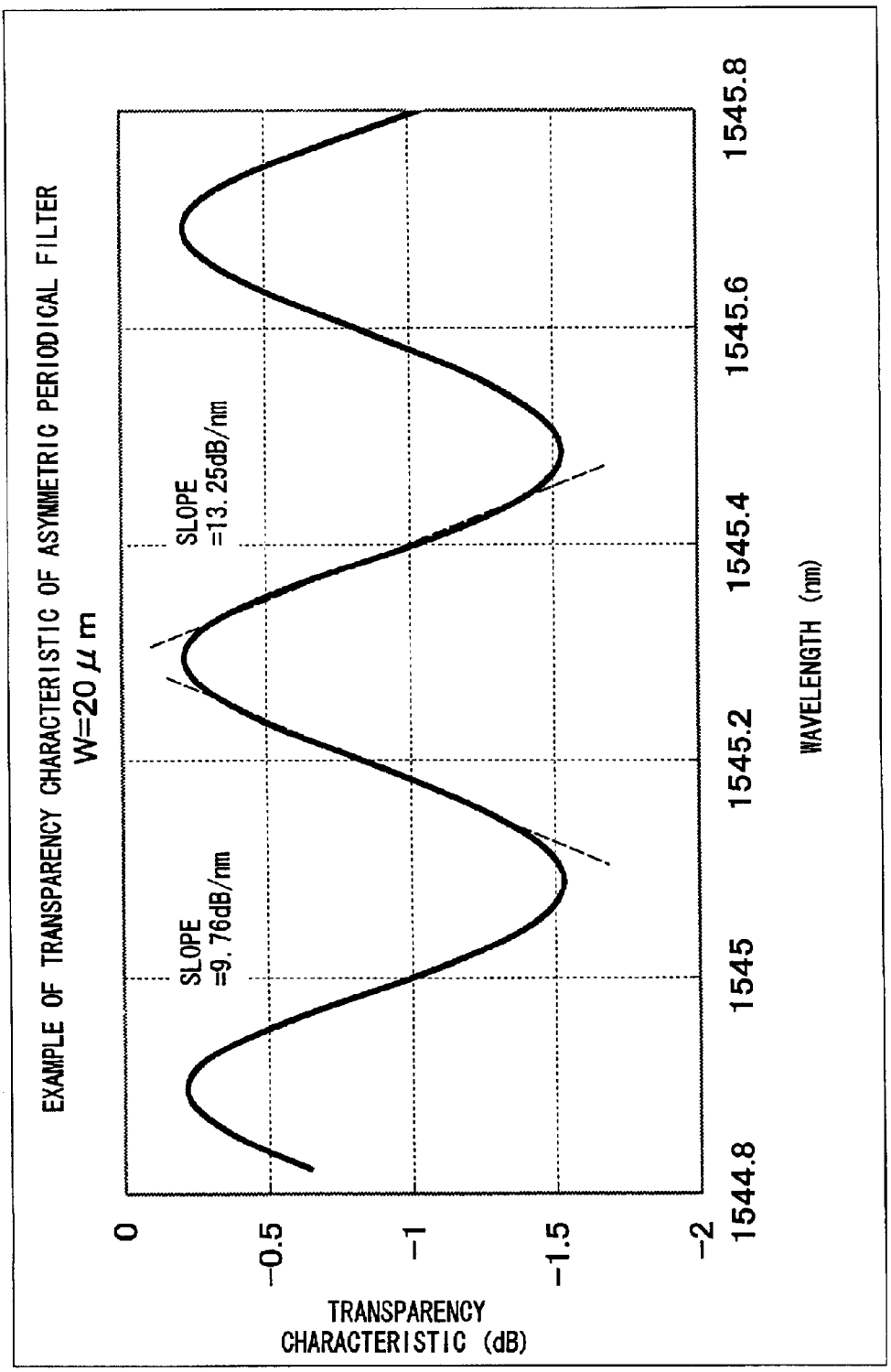
FIG. 6 shows an example where diverged light having a diverging angle θ of 1.4 degrees is input to an etalon.

Accordingly, an example where diverging light whose beam radius W is 20 μm, and whose diverging angle θ is 1.4 degrees is input to the etalon is shown in FIG. 6.

The degree of asymmetry is 9.76/13.25=0.737.

Namely, an angular distribution of light flux which is made to pass through the etalon is changed, whereby the asymmetry of the transparency characteristic can be changed.

Figure 7:
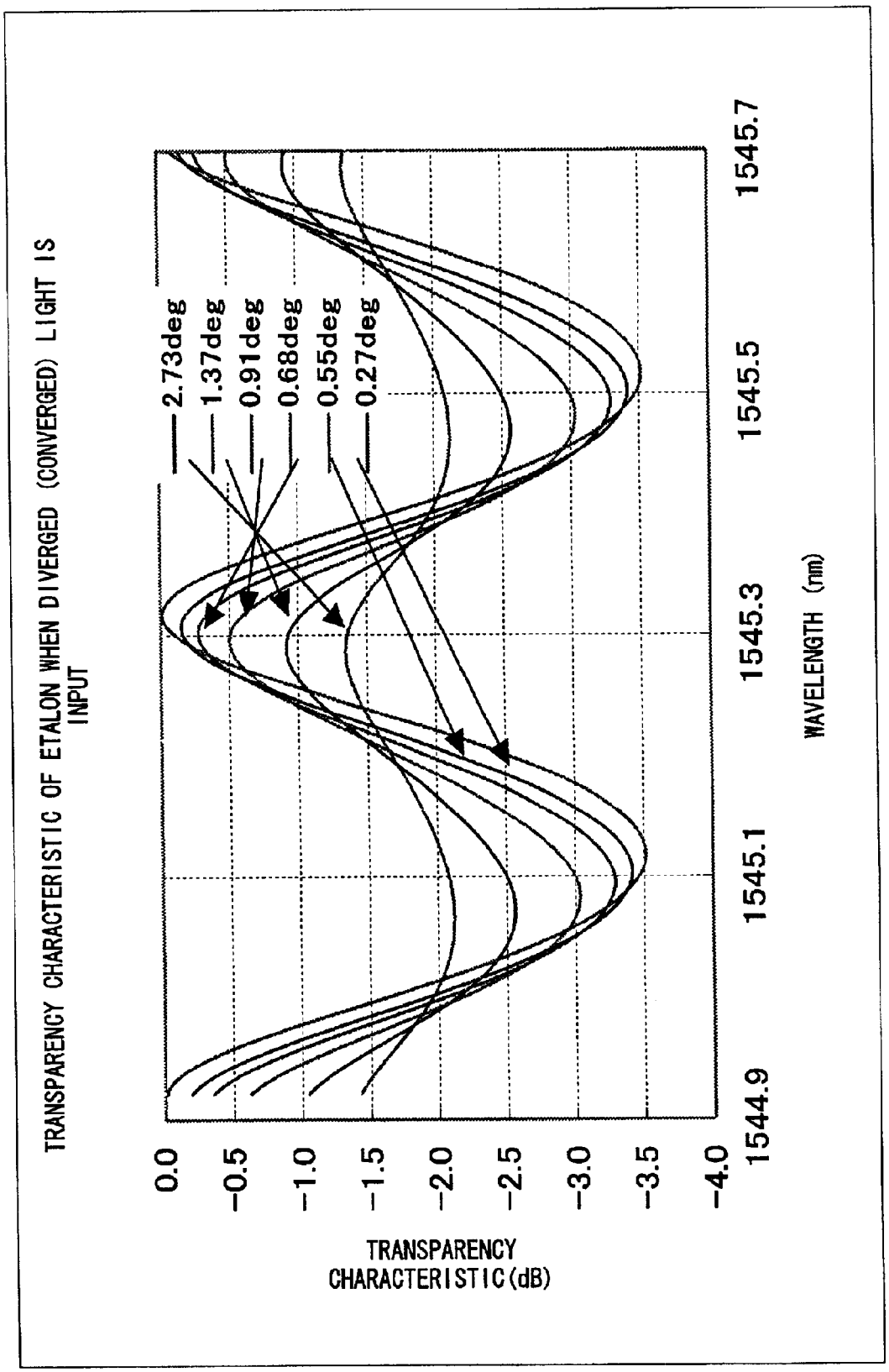
FIG. 7 shows a change in the asymmetry of the transparency characteristic depending on a beam diverging angle θ.
Figure 8:
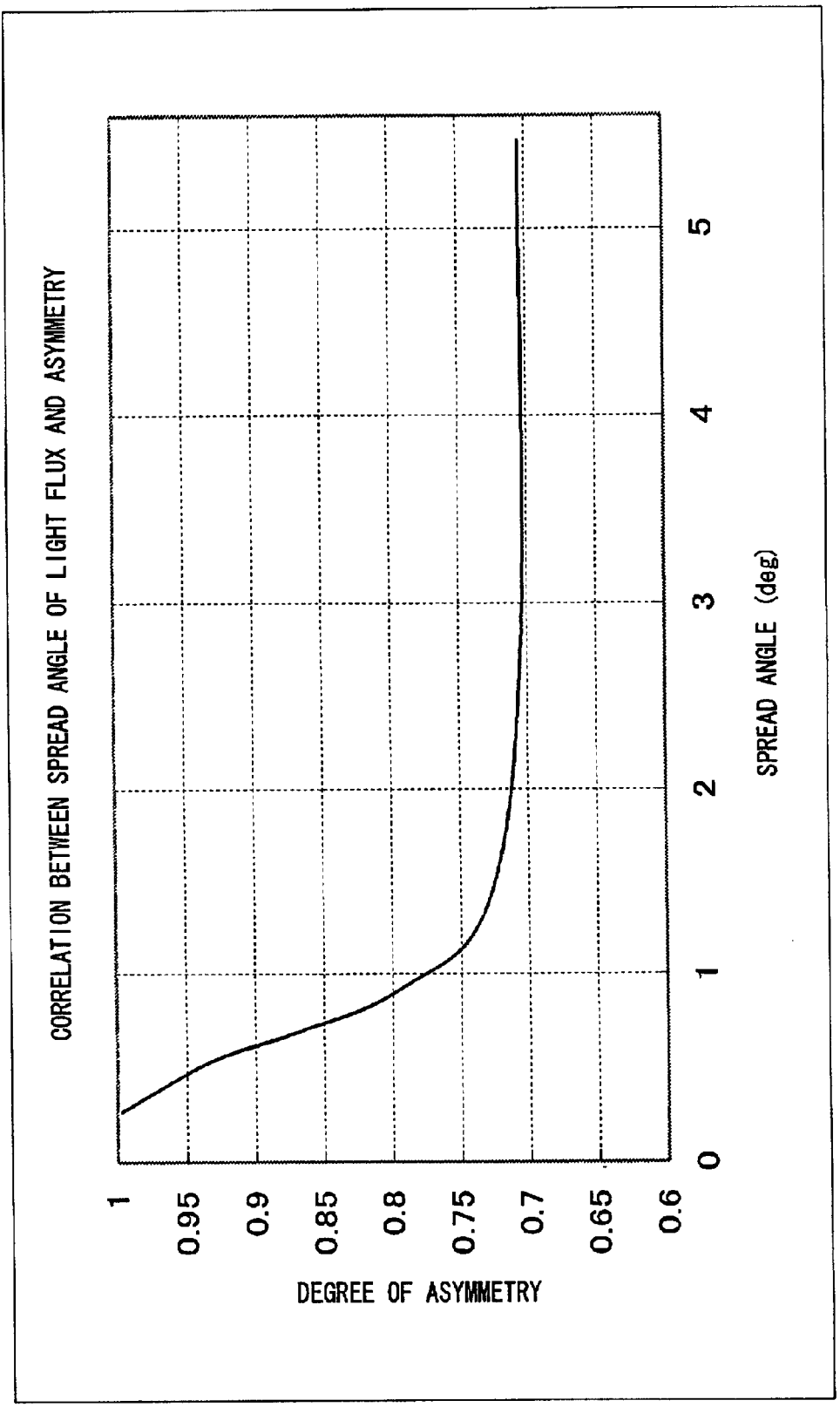
FIG. 8 shows the relationship between the beam diverging angle θ and the degree of asymmetry of a transparency characteristic.

A change according to the beam diverging angle θ is shown in FIG. 7, and the relationship between the beam diverging angle θ and the degree of asymmetry which indicates the degree of asymmetry of the transparency characteristic is shown in FIG. 8. To reduce the degree of asymmetry to 0.95 or lower, at least the beam diverging angle θ≧0.5 degrees is required. To reduce the degree of asymmetry to a sufficient asymmetry degree 0.78 or lower, it is desirable that the beam diverging angle θ is 1 degree or higher.

For a normally used parallel light (collimated light) whose beam radius W is 100 μm or more, its diverging angle is 0.28 degrees according to the equation (6), and is clearly different from the asymmetric periodical filter used by the present invention.

As is evident from the equation (6), the angular distribution (beam diverging angle) of light flux which is made to pass through the etalon is determined according to the beam radius of a beam waist.

Accordingly, it is possible to select an optical fiber having a suitable mode field radius, to use a thermally-diffused expand core fiber whose core is thermally expanded to change the mode field radius of an optical fiber, or to adjust the beam waist size by image conversion of a lens.

Figure 9:
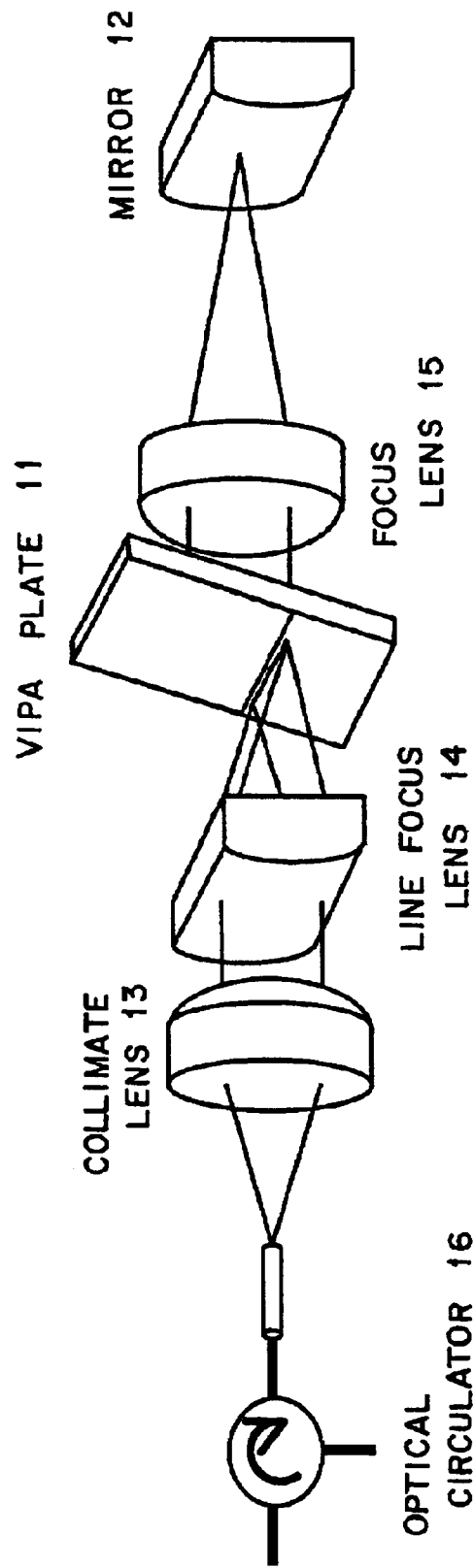
FIG. 9 shows the configuration of a dispersion compensator using VIPA.
Figure 10:
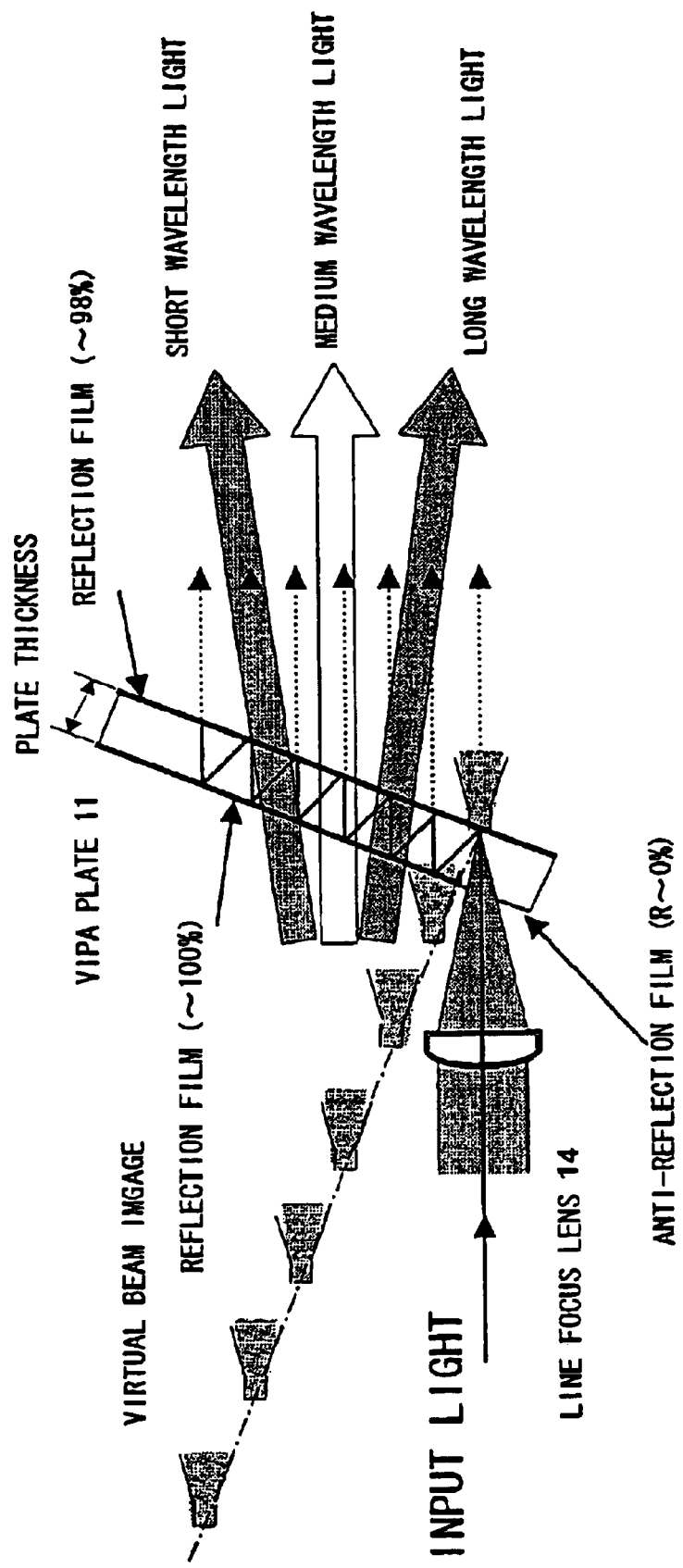
FIG. 10 shows the principle of light splitting of VIPA.
Figure 11:
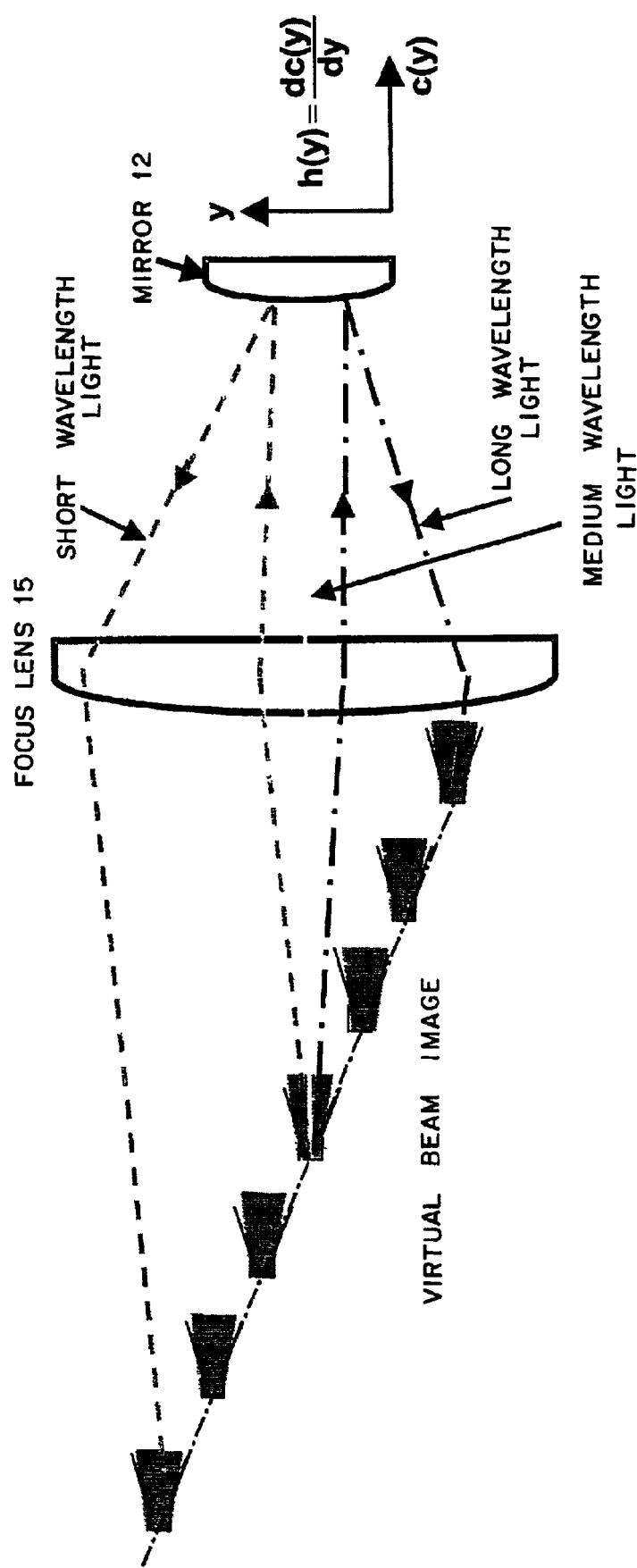
FIG. 11 shows the principle of dispersion compensation.

Configuration of a dispersion compensator using a VIPA is shown in FIG. 9, the principle of light splitting of the VIPA is shown in FIG. 10, and the principle of dispersion compensation is shown in FIG. 11.

A VIPA element is a virtual step diffractive grating implemented by coating a reflection film on both sides of a transparent member (glass thin plate).

The dispersion compensator using the VIPA is configured by a VIPA plate 11, a reflection mirror 12, and a plurality of lenses 14 and 15.

Signal light that is input from an optical fiber to the VIPA variable dispersion compensator passes through an optical circulator 16, a collimator lens 13, and a line focus lens 14, and enters the VIPA plate 11.

The VIPA plate 11 is a glass plate where a reflection film of approximately 100 percent and that of approximately 98 percent (translucent reflection film) are respectively formed on an input side end face and an output side end face.

The signal light is input to the VIPA plate 11 by being focused by the lens 14.

The signal light is repeatedly multiple-reflected while spreading light.

At that time, part of the signal light is output from the output side end face.

As a result, the VIPA becomes a diffractive grating whose diffractive order is large, and the output light propagates in the direction which satisfies the constructive interference condition as shown in FIG. 10.

Light focused on the mirror 12 that is positioned in the rear of the focus lens 15 returns to an arbitrary position according to a reflection angle determined according to the shape of the mirror 12 at a light focusing position and is coupled to an optical fiber on a path reverse to that at the time of input.

If the reflection mirror 12 is shaped to be convex, light on the short wavelength side returns to the beam waist on the upper side, and its optical path length becomes longer than light on the long wavelength side. As a result, a delay increases.

Accordingly, the VIPA variable dispersion compensator generates negative distribution in this case.

Inversely, if the reflection mirror is shaped to be concave, positive dispersion can be generated.

With a dispersion compensator using a VIPA, light returns on the same path, Therefore, the compensator can be used inline with a circulator 16.

The mirror 12 is configured by a curved surface having a successive change from the convex surface to the concave surface. Such a mirror 12 is moved in the change direction of the curved surface with reference to the light from the VIPA plate 11, so that a variable dispersion value can be obtained.

Figure 1:
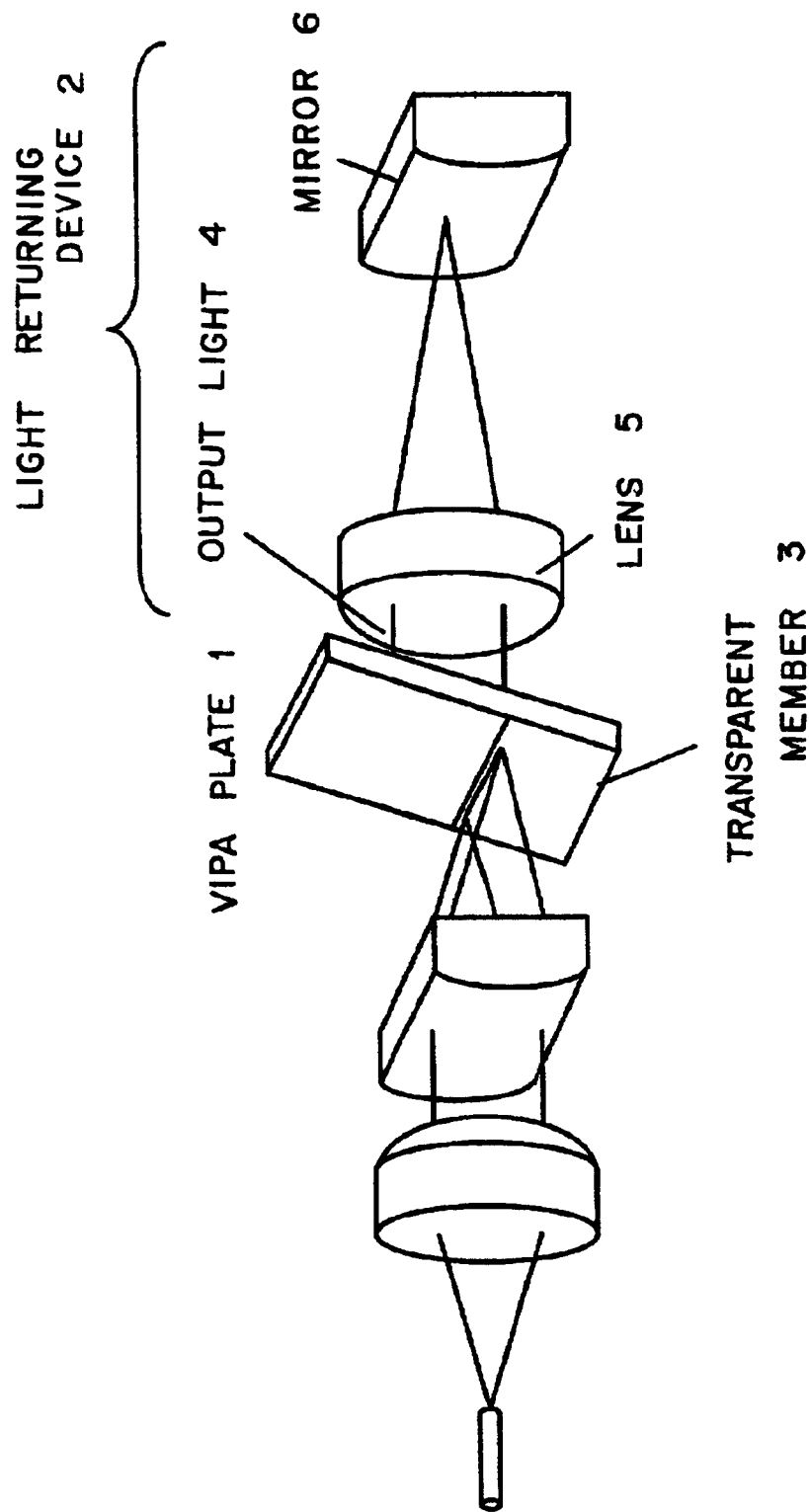
FIG. 1 shows a virtually imaged phased array.
Figure 2:
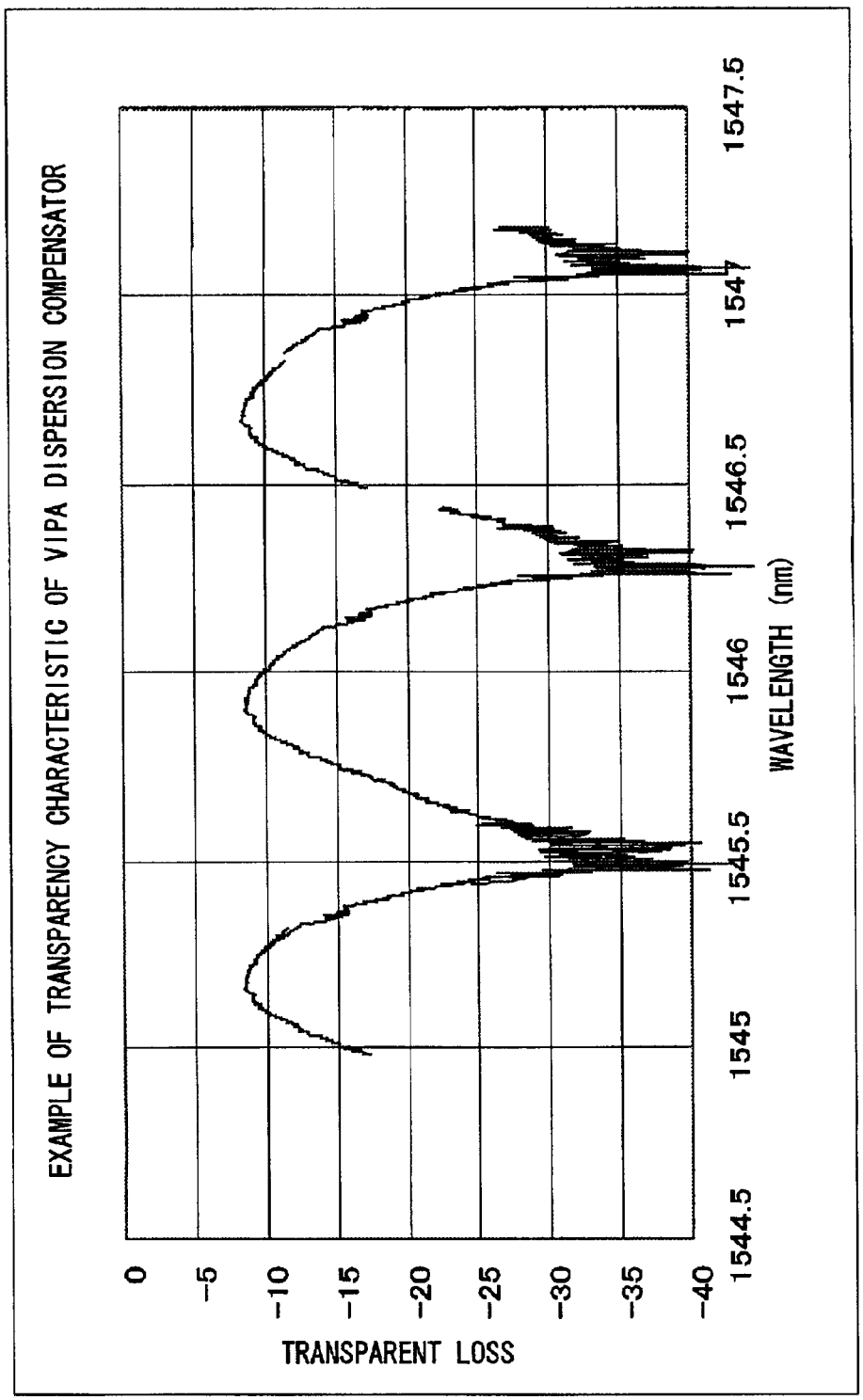
FIG. 2 shows the transparency characteristic of the virtually imaged phased array.

However, for a device using such a VIPA plate, its transmittance characteristic of an optical wavelength, when light passes through, becomes not a desirable flat characteristic, but a periodical characteristic which is asymmetric with reference to the peak of a wavelength within a continuous transparent wavelength band as shown in FIG. 2.

In this preferred embodiment, a cycle, namely, an FSR (Free Spectral Range) is set to 100 GHz (equivalent to approximately 0.8 nm in a band of a wavelength λ=1500 nm) in order to support a WDM signal at 100-GHz spacing. Therefore, optical glass whose refractive index n=1.8 is used as the glass material of the VIPA plate, and a plate thickness t is set to approximately 0.8 mm.

To improve this characteristic, a filter having a desired asymmetric periodical characteristic is connected to the device using the VIPA according to the preferred embodiment of the present invention.

Figure 12:
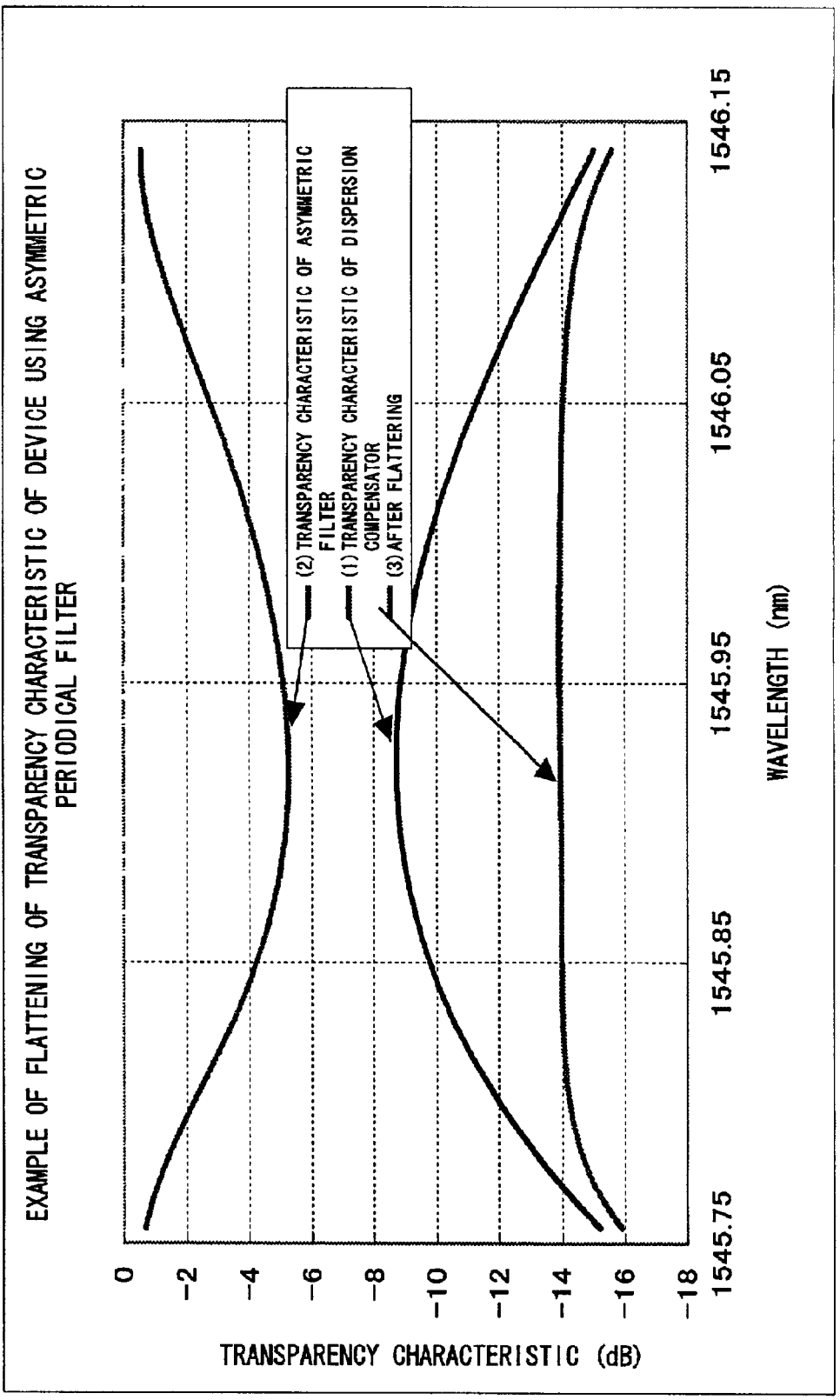
FIG. 12 exemplifies the flattening of the transparency characteristic of a device using an asymmetric periodical filter.

Explanation is provided by taking one typical wavelength characteristic ((1) of FIG. 12) of the asymmetric periodical characteristic of the dispersion compensator using the VIPA plate. Namely, design of the asymmetric periodical filter is optimized so that an asymmetric periodical characteristic which is shown in (2) of FIG. 12 and reverse to the characteristic shown in (1) can be obtained. By connecting the asymmetric periodical filter to the dispersion compensator using the VIPA, a flat transparency characteristic can be implemented over a wide bandwidth as shown in (3) of FIG. 12.

If the FSR of the asymmetric periodical filter is the same as that of the dispersion compensator using the VIPA, or an integral submultiple of the FSR of the dispersion compensator, this means that a flat transparency characteristic can be implemented over the whole of each transparent wavelength band (namely, each signal CH of WDM) of the dispersion compensator using the VIPA.

A method implementing a filter having such a desired asymmetric periodical characteristic is specifically described next.

A preferred embodiment according to the present invention is explained with reference to FIG. 13.

Outline of the configuration of the asymmetric periodical filter according to the preferred embodiment of the present invention is shown in FIG. 13. This asymmetric periodical filter is configured by a pair of optical fibers 21 and 22, a lens 23 for focusing the diverged light output from the optical fiber 21 and for coupling the light to the other optical fiber 22, and an etalon 24.

In this preferred embodiment, thermally-diffused expand core fibers 21 and 22, whose core radius is expanded by thermally diffusing the end face of an SMF (Single Mode Fiber), are used as the optical fibers, and their mode field radius (=beam radius≈core radius) $W3(=W4)=22$ μm. Therefore, if the wavelength λ of light is equal to 1.5 μm, the beam diverging angle θ3 results in 1.2 degrees according to the above provided equation (7).

Additionally, the lens 23 has a focal length f. Here, generally, the following equations are satisfied.

$$1/d1+1/d2=1/f \quad (8)$$

$$M=W2/W1=d2/d1 \quad (9)$$

where d1 and d2 indicate the distance from the lens, M indicates image magnification, and W1 and W2 indicate beam radii.

Accordingly, if the pair of fibers 21 and 22 and the lens 23 are positioned to be d1=d2=2f as shown in FIG. 13, W2=W1=22 μm in case of M=1 (equimultiple), and the beam size matches the mode field radius of the optical fibers, so that the light from the optical fiber 21 on the output side can be coupled to the optical fiber 22 on the input side.

Here, as shown in FIG. 13, the etalon 24 is interposed (a position (1)) between the optical fiber 21 and the lens 23, and diverging light is input to the etalon 24. This is equivalent to an input of light having a different input angle to the etalon 24 as shown in this figure. As a result, asymmetry occurs in the transparency characteristic.

Since the beam diverging angle is θ1=θ2=1.2 degrees in this preferred embodiment, exactly the same effect can be obtained also by interposing the etalon 24 in a position (2), and by inputting a converged light to the etalon.

In this preferred embodiment, a cavity material of the etalon 24 is implemented by quartz (refractive index n=1.45), the plate thickness t is set to approximately 2 mm, an FSR is set to 50 GHz (equivalent to approximately 0.4 nm in band of a wavelength λ=1500 nm), which is exactly one half of the FSR of the VIPA plate, and a reflection film (not shown) configured by a dielectric multilayer film is formed on both sides of the etalon 24, so that the reflectance is 32 percent.

The FSR is determined as follows.

$$FSR=c/2nt \quad (10)$$

where FSR indicates a free spectral range, and c indicates light speed.

The transparency characteristic obtained in this preferred embodiment becomes the one shown in (2) of FIG. 12, which is earlier shown, and the asymmetric characteristic is proved to be obtained.

Figure 14:
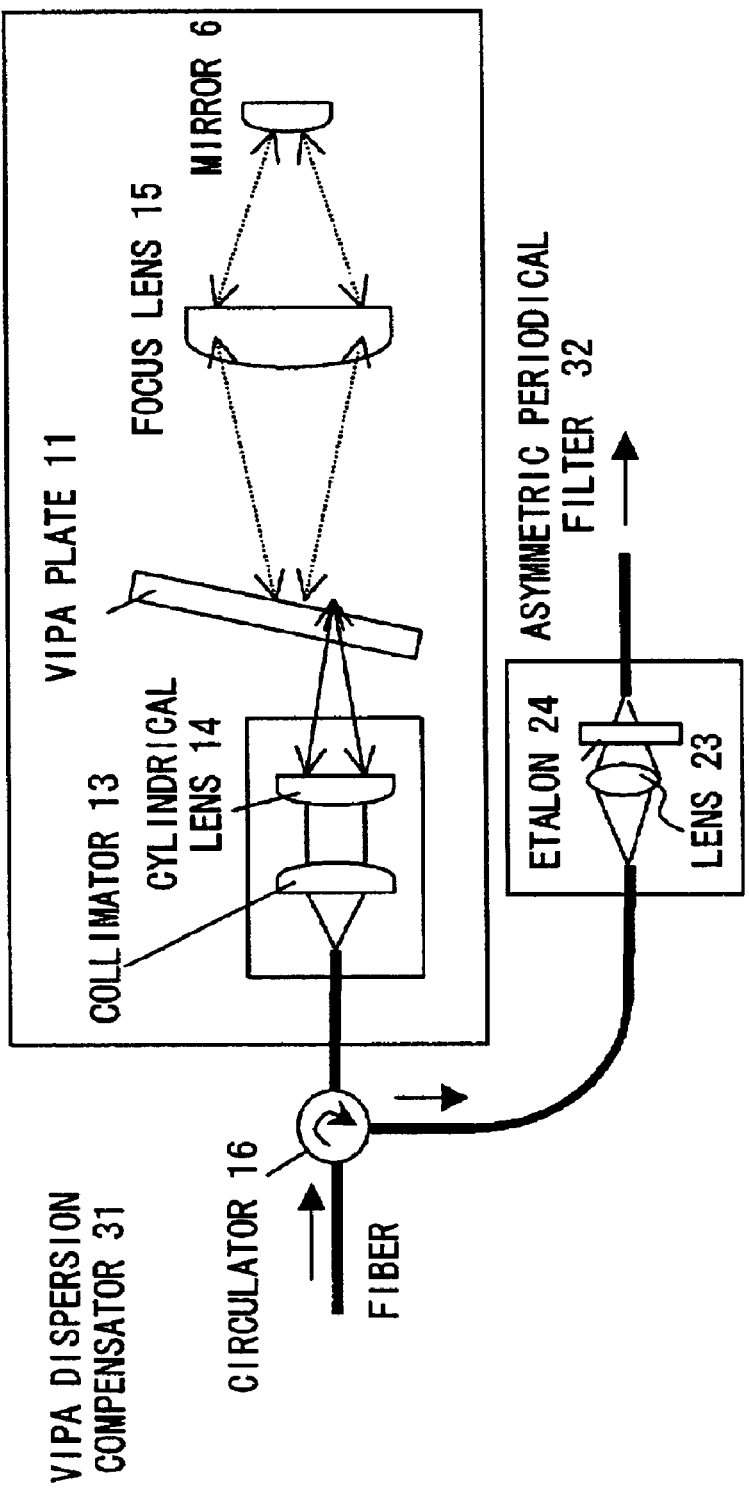
FIG. 14 shows a configuration implemented by combining the asymmetric periodical filter shown in FIG. 13 with a VIPA dispersion compensator.

If a VIPA dispersion compensator 31 and an asymmetric periodical filter 32 according to this preferred embodiment are connected via a circulator 16 as shown in FIG. 14, the transparency characteristic of light, which has the characteristic shown in (1) of FIG. 12 and is reflected by the mirror 6, can be flattened over a broad range as shown in (3) of FIG. 12.

Accordingly, with a wavelength multiplexing transmission device comprising such an optical device whose transparency characteristic is flattened, the waveform of a signal can be prevented from being degraded at least due to the transparency characteristic of the optical device.

In the configuration shown in FIG. 14, the etalon 24 is arranged on the converged light side. However, the etalon 24 may be arranged on the diverging light side (circulator 16 side) if a condition for enabling flattening can be satisfied.

In FIG. 14, the same constituent elements as those in FIG. 9 are denoted with the same reference numerals, and their functions are the same. Therefore, their explanation is omitted here.

Additionally, the asymmetric periodical filter 32 according to the present invention may be arranged on the input side of the VIPA element or the VIPA dispersion compensator.

Figure 15:
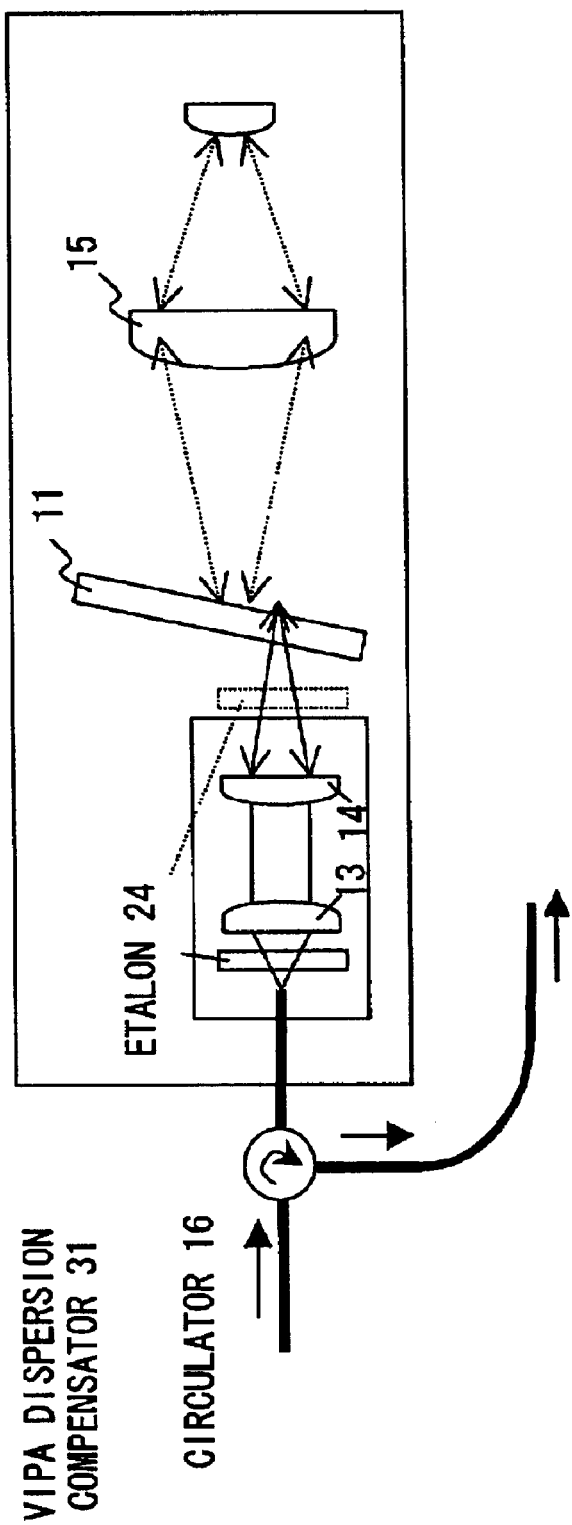
FIG. 15 shows a configuration implemented by combining the asymmetric periodical filter shown in FIG. 13 with a VIPA dispersion compensator.

Since the lens is comprised on the input light side of the VIPA element or the VIPA dispersion compensator, the most effective configuration is the one where the etalon 24 is interposed between the lens 13 on the incident light side or between the VIPA plate 11 and the lens 14 within the VIPA dispersion compensator as shown in FIG. 15. This configuration is effective also due to the reason that the number of components is small.

The configuration where the asymmetric periodical filter is arranged on the output light side of the optical device that makes VIPA dispersion compensation as shown in FIG. 14, and the configuration where the asymmetric periodical filter is arranged on the input light side of the VIPA element or the VIPA dispersion compensator as shown in FIG. 15 may be combined and used.

Configuration of a similar asymmetric periodical filter is exemplified next.

A specific example of the configuration of the asymmetric periodical filter is described with reference to FIG. 16.

This preferred embodiment adopts an optical fiber 25 having a mode field radius W3=5 μm as one optical fiber, and a thermally-diffused expand core fiber 22 having a mode field radius W4=22 μm, which is similar to that in the above described preferred embodiment, as the other optical fiber.

The etalon 24 is similar to that in the above described preferred embodiments.

Here, in this preferred embodiment, distances d3 and d4 between a lens 26 and the optical fibers 25 and 22 are set to be 5:22. Therefore, M=d4/d3=4.4=W6/W5, an image magnification M results in 4.4 times, and a beam size matches the mode field radius of the optical fibers because W3=5 μm and W4=22 μm, so that light can be coupled.

Figure 16:
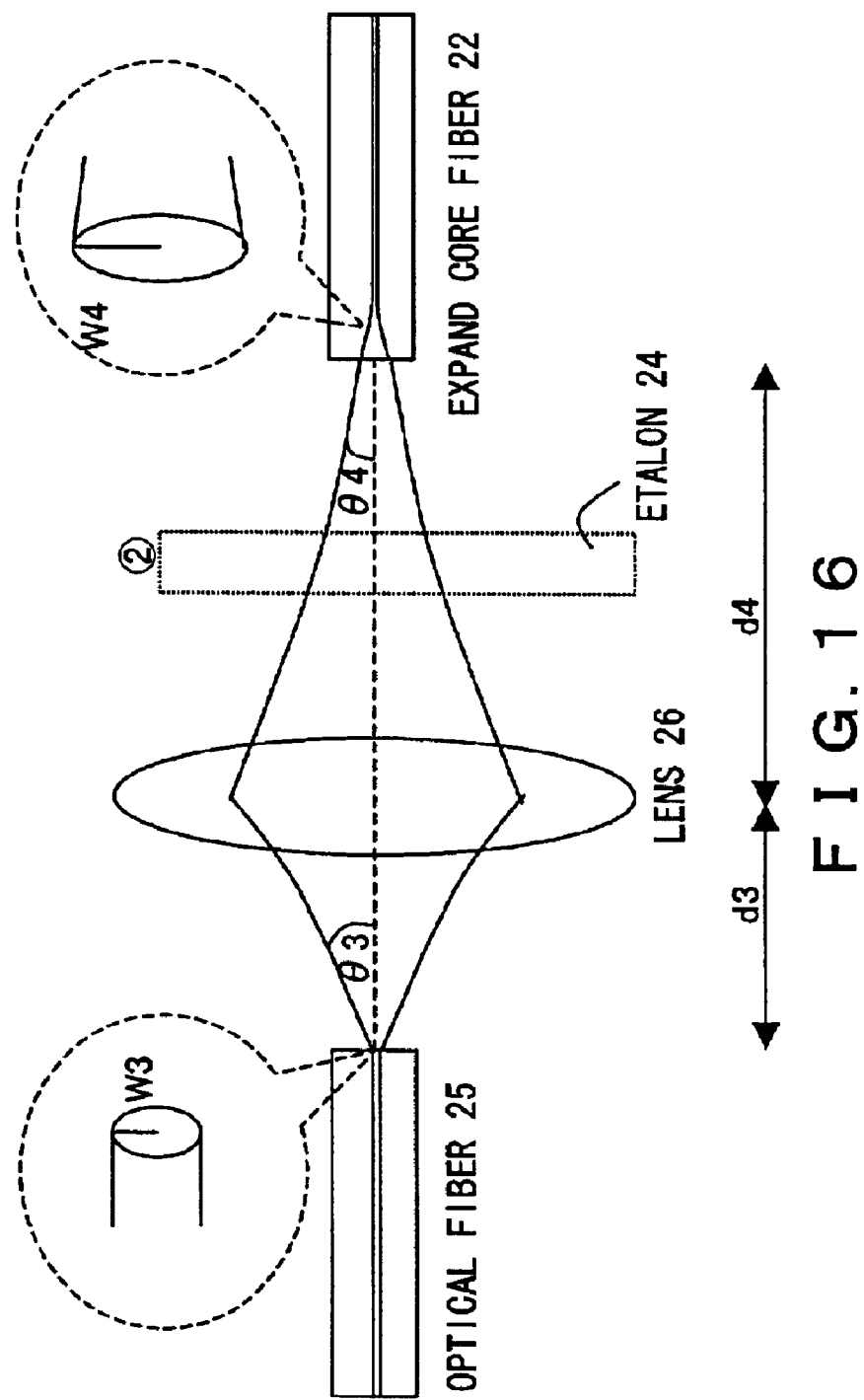
FIG. 16 shows the outline of the configuration of the asymmetric periodic al filter.

Here, if the etalon 24 is interposed between the thermally-diffused expand core fiber 22 and the lens 26 as shown in FIG. 16, an asymmetric transparency characteristic shown in (2) of FIG. 12 can be obtained in a similar manner as in the above described preferred embodiment. Here, beam diverging angles θ3 and θ4 are different, and θ4=1.2 degrees.

By adjusting d3, d4, and the core radii of the optical fibers, the etalon can be arranged between the optical fiber 25 and the lens 26.

Another aspect of the invention for obtaining a similar asymmetric periodical filter is described next.

This preferred embodiment according to the present invention is explained with reference to FIGS. 17 and 18. FIGS. 17 and 18 show the outlines of the configurations of the asymmetric periodical filter according to the present invention. This asymmetric periodical filter is configured by a pair of lenses 43 and 44, and an etalon 24.

Optical fibers 41 and 42 are similar to the optical fiber 25 having the mode field radius W3=5 μm, and the etalon 24 is similar to that in the above described preferred embodiments.

The lenses 43 and 44 in this preferred embodiment are the same, and has a focal length f=1.8 mm.

Here, generally, the following equations are satisfied.

$$d6 = ((\pi W5^2/\lambda)^2 / f - d5(1 - d5/f)) / ((\pi W5^2/\lambda)^2 (1/f)^2 + (1 - d5/f)^2) \quad (11)$$

$$W6 = (W5^2 / ((\pi W5^2/\lambda)^2 (1/f)^2 + (1 - d5/f)^2))^{1/2} \quad (12)$$

where d5 and d6 indicate distances from the lens, and W5 and W6 indicate beam radii.

In this preferred embodiment, if it is assumed that W5=5 μm, f=1.8 mm, λ=1.5 μm, and d5=2.204 mm, d6=9.69 mm, and W6=22 μm are obtained according to the equations (10) and (11). Additionally, at this time, a beam diverging angle θ5=1.2 degrees is obtained according to the equation (6).

Furthermore, as shown in FIG. 17, the pair of fibers 41 and 42 and the lenses 43 and 44 are positioned so that d5=d8 and d6=d7. As a result, a beam size matches the mode field radius of the optical fibers, so that the light from the optical fiber 41 on the output side can be coupled to the optical fiber 42 on the input side.

Here, if the etalon 24 is interposed between the pair of lenses 43 and 44, an asymmetric transparency characteristic can be obtained. The transparency characteristic at this time is the one shown in (2) of FIG. 12.

Next, if the lens 43 is arranged nearer to the optical fiber 41 as shown in FIG. 18, and d9 is set to be smaller than d5, W8 can be widened according to the equation (11). Consequently, θ6 can be made smaller than θ5 according to the equation (6).

Since d10 becomes larger than d6 according to the equation (10) at this time, d11 (d=10) must be naturally increased. Therefore, the lens 44 must be arranged away from the lens 43.

Additionally, d12 (=d9) must be reduced, and the optical fiber 42 must be arranged nearer to the lens 44.

By changing the distance between an optical fiber and a lens, and the distance between lenses as described above, the angular distribution of light flux which is made to pass through an etalon can be changed, thereby adjusting to desired asymmetry.

The configurations shown in FIGS. 16 to 18 can be respectively used for the asymmetric periodical filter arranged on the output side of FIG. 14, the asymmetric periodical filter arranged on the input side of FIG. 15, and the asymmetric periodical filter, which is implemented by combining the configurations shown in FIGS. 14 and 15 and is arranged on both the input and the output sides.

As described above, according to the preferred embodiments of the present invention, a device, which generates approximately constant wavelength dispersion regardless of a wavelength and simultaneously compensates for dispersion actually accumulated in an optical fiber in multiple wavelength regime of many channels, can be provided, and the wavelength characteristic of a transmittance can be implemented as a desired one.

For the above described filter which has an asymmetric transparency characteristic with an etalon, angular dispersion of light input to the etalon is mainly described as a design parameter of the filter. A person having an ordinary skill in the art can easily hits upon an idea that also the reflectance of a reflection film arranged on both sides of the etalon must be considered. Namely, as is well known, an etalon has a nature such that the higher the reflectance of a reflection film, the thinner the transparent band and the narrower the wavelength width of the transparent band, which centers a central wavelength. Accordingly, what filter characteristic is required is determined for the transparent band of a wavelength dispersion compensator using a VIPA plate, which is intended to compensate for asymmetry, and the reflectance of a reflection film must be determined based on the filter characteristic. Furthermore, since also the size of an etalon gap determines the cycle of a periodical transparency characteristic of the etalon, it must be considered as a design parameter.

Some preferred embodiments according to the present invention are described above. It is evident that a person having an ordinary skill in the art can make a modification in the scope defined by claims or its equivalent scope based on the principle of the present invention.

The transparency characteristic of an optical device comprising a VIPA can be flattened by connecting to a device comprising the VIPA an etalon filter having a desired asymmetric periodical characteristic by making diverged or converged light having an angular distribution pass through the etalon.

What is claimed is:

1. An apparatus comprising:

a virtually imaged phased array (VIPA) receiving a light, having a plurality of transmitting areas that output the light, dispersing the light having each wavelength within a continuous wavelength range at a different output angle and forming an output light spatially distinguishable from an output light formed for an input light having another wavelength within the continuous wavelength range;

a lens focusing the output light having different output angles for each wavelength to different positions for each wavelength;

a mirror reflecting back the focused light to the lens, the lens returning the reflected output light to VIPA, thereby the reflected light being multiple-reflected in the VIPA and output through the transmitting area from VIPA and the mirror having a shape such that the output light from VIPA receives an approximately constant wavelength dispersion regardless of the wavelength; and a filter having a desired asymmetrical periodic characteristic by passing a diverging or converging light having an angular distribution through an etalon, whereby the apparatus achieves a desired transmitting wavelength characteristic.

2. The apparatus according to claim 1, wherein a cycle of said asymmetric periodical filter is equal to or an integral submultiple of a cycle the VIPA.

3. The apparatus according to claim 1, wherein an angular distribution of light flux which is made to pass through the etalon is changed in said asymmetric periodical filter, so that a transparency characteristic is adjusted to desired asymmetry.

4. The apparatus according to claim 1,
said asymmetric periodical filter comprising:
a pair of optical fibers,
a lens focusing a diverging light output from one of said pair of optical fibers, and coupling the light to the other of said pair of optical fibers, and
an etalon,
wherein said etalon is interposed between one of said pair of optical fibers and said lens, and diverged or converged light is made to pass through said etalon.

5. The apparatus according to claim 4, wherein said pair of optical fibers or one of said pair of the optical fibers is a thermally-diffused expand core fiber.

6. The apparatus according to claim 1,
said asymmetric periodical filter comprising:
a pair of optical fibers,
a pair of lenses performing image conversion, and
an etalon,
wherein said etalon is interposed between said pair of lenses, and diverged or converged light is made to pass through said etalon.

7. The apparatus according to claim 5, wherein a distance between the optical fiber and the lens, and a distance between lenses are changed, so that an angular distribution of light flux which is made to pass through the etalon is changed, and a transparency characteristic is adjusted to a desired asymmetric characteristic.

8. The apparatus comprising any one of the apparatus according to claim 1 to 7,
wherein wavelength dispersion is compensated, and a flat transparent wavelength characteristic is provided, so that signal waveform degradation is improved.

9. An optical device, comprising:
an optical element, in which a translucent reflection film and a reflection film are respectively arranged on one side and the other side of a transparent member, and to which converged or diverged light is input; and
an asymmetric periodical filter having an asymmetric periodical characteristic that is produced by a first part of the asymmetric periodical filter converging or diverging inputted light to a second part of the asymmetric periodical filter, which is arranged on an input light side of said optical element.

10. An optical device, comprising:
an optical element, in which a translucent reflection film and a reflection film are respectively arranged on one side and the other side of a transparent member, and to which converged or diverged light is input;
a mirror reflecting light split by said optical element on said optical element; and
an asymmetric periodical filter passing light reflected by said mirror with an asymmetric periodical characteristic which is produced by a first part of the asymmetric periodical filter converging or diverging inputted light to a second part of the asymmetric periodical filter.

11. The optical device according to claim 9 or 10, wherein a cycle of said asymmetric periodical filter is equal to or an integral submultiple of a cycle of said optical element.

12. The optical device according to claim 9 or 10, wherein said asymmetric periodical filter is an etalon, and diverged or converged light is made to pass through the etalon, so that a desired transparent wavelength characteristic is obtained.

13. The optical device according to claim 9 or 10 said asymmetric periodical filter comprising:
a pair of optical fibers,
at least one lens focusing a diverged light output from one of said pair of optical fibers, and coupling the light to the other of said pair of optical fibers as converged light, and
an etalon;
wherein said etalon is interposed between one of said pair of optical fibers and said lens, and diverged or converged light is made to pass through said etalon, and a mode field radius of each of the pair of optical fibers or the distance between the at least one lens and the etalon is adjusted to achieve a desired asymmetry.

14. An optical device, comprising:
an optical element, having a translucent reflection film and a reflection film respectively arranged on one side and the other side of a transparent member, and to which converged or diverged light is input; and
an asymmetric periodical filter arranged an input light side of said optical element having distances between a first part of the asymmetric periodical filter and a second part of the asymmetric filter adjusted to achieve a desired asymmetry.

15. The optical device according to claim 14, further comprising a mirror reflecting light split by the optical element on the optical element.

16. The optical device according to claim 14, wherein a cycle of the asymmetric periodical filter is equal to or an integral submultiple of a cycle of the optical element.

17. The optical device according to claim 14, wherein the asymmetric periodical filter is an etalon, and diverged or converged light is made to pass through the etalon, so that a desired transparent wavelength characteristic is obtained.

18. The optical device according to claim 14, the asymmetric periodical filter comprising:
a pair of optical fibers,
at least one lens focusing a diverged light output from one of said pair of optical fibers and coupling the light to the other of said pair of optical fibers as converged light, and
an etalon,
wherein the etalon is interposed between one of said pair of optical fibers and said lens, and diverged or converged light is made to pass through the etalon, and a mode field radius of each of the pair of optical fibers or the distance between the at least one lens and the etalon is adjusted to achieve a desired asymmetry.

* * * * *

UNITED STATES PATENT AND TRADEMARK OFFICE
CERTIFICATE OF CORRECTION

PATENT NO. : 6,900,940 B2  
APPLICATION NO. : 10/164438  
DATED : May 31, 2005  
INVENTOR(S) : Nobuaki Mitamura et al.

It is certified that error appears in the above-identified patent and that said Letters Patent is hereby corrected as shown below:

Title Page, Column 2 (Other Publications), Line 4, delete "Appl." and insert -- Patent -- therefor.

Title Page, Column 2 (Other Publications), Line 7, delete "Appl." and insert -- Patent -- therefor.

Column 14, Line 33, after "arranged" insert -- on --.

Signed and Sealed this

Twenty-fifth Day of July, 2006

JON W. DUDAS  
*Director of the United States Patent and Trademark Office*